United States Patent
Kim et al.

(10) Patent No.: US 11,031,825 B2
(45) Date of Patent: Jun. 8, 2021

(54) WIRELESS POWER TRANSMISSION APPARATUS AND METHOD

(71) Applicant: LG ELECTRONICS INC., Seoul (KR)

(72) Inventors: Kyunghwan Kim, Seoul (KR); Jeongkyo Seo, Seoul (KR); Jinho Youn, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 16/475,281

(22) PCT Filed: Jan. 2, 2018

(86) PCT No.: PCT/KR2018/000039
§ 371 (c)(1),
(2) Date: Jul. 1, 2019

(87) PCT Pub. No.: WO2018/135774
PCT Pub. Date: Jul. 26, 2018

(65) Prior Publication Data
US 2019/0334389 A1    Oct. 31, 2019

(30) Foreign Application Priority Data
Jan. 20, 2017  (KR) .................. 10-2017-0009617

(51) Int. Cl.
*H02J 50/60*        (2016.01)
*H02J 50/90*        (2016.01)
(Continued)

(52) U.S. Cl.
CPC ............... *H02J 50/60* (2016.02); *G01V 8/14* (2013.01); *G02B 27/14* (2013.01); *H02J 7/025* (2013.01); *H02J 50/30* (2016.02); *H02J 50/90* (2016.02)

(58) Field of Classification Search
CPC .. H02J 50/60; H02J 50/90; H02J 50/30; H02J 7/025; G01V 8/14; G02B 27/14
(Continued)

(56) References Cited

U.S. PATENT DOCUMENTS 7,078,666 B2 *  7/2006  Tuominen ............ H04B 10/807
                                                        136/243
2009/0243397 A1  10/2009  Cook et al.
(Continued)

FOREIGN PATENT DOCUMENTS

JP    2008-245404 A    10/2008
JP    2008-259392 A    10/2008
(Continued)

*Primary Examiner* — Michael R. Fin
(74) *Attorney, Agent, or Firm* — Birch, Stewart, Kolasch & Birch LLP

(57) ABSTRACT

Disclosed in the present specification are a wireless power transmission apparatus, and a method therefor. The wireless power transmission apparatus (Tx) according to one embodiment of the present invention comprises: a laser light source unit; a light output unit for outputting, for wireless charging, laser light generated by the laser light source unit to a light receiving unit of a wireless power receiving apparatus; a foreign object (FO) sensing unit for sensing an FO by utilizing supplementary light; and a control unit for controlling the laser light output when an FO is sensed by the FO sensing unit.

12 Claims, 11 Drawing Sheets

*OP : Optics Part (i = 1,2,...n)   *PB : Power beaming   *BS : Beam splitter

(51) Int. Cl.
*H02J 50/30* (2016.01)
*G01V 8/14* (2006.01)
*G02B 27/14* (2006.01)
*H02J 7/02* (2016.01)

(58) Field of Classification Search
USPC .......................................................... 307/149
See application file for complete search history.

(56) References Cited

U.S. PATENT DOCUMENTS

2018/0136364 A1\* 5/2018 Kare ..................... H02J 50/10
2019/0064353 A1\* 2/2019 Nugent, Jr. ........... G01S 17/003

FOREIGN PATENT DOCUMENTS

KR    10-2012-0009929 A    2/2012
KR    10-2013-0098071 A    9/2013
KR    10-2016-0132129 A    11/2016

\* cited by examiner

— PB laser
----- FOD light

*PD : Photo-detector   *$V_{ref}$ : Threshold level   *$\alpha$: Threshold margin

WIRELESS POWER TRANSMISSION APPARATUS AND METHOD

CROSS REFERENCE TO RELATED APPLICATIONS

This application is the National Phase of PCT/KR2018/000039 filed on Jan. 2, 2018, which claims priority under 35 U.S.C. § 119(a) to Patent Application No. 10-2017-0009617 filed in Republic of Korea on Jan. 20, 2017, all of these applications are hereby expressly incorporated by reference into the present application.

TECHNICAL FIELD

The present disclosure relates to a wireless power transmission apparatus and method thereof.

BACKGROUND ART

In recent years, wireless power transmission technology (technique) has been widely deployed. For example, the wireless power transmission technology has been researched and developed not only for wireless charging of a smartphone, an electric vehicle, etc. but also for application fields such as provision of power to a wearable device, a sensor for Internet of Things (IoT), etc.

The wireless power transmission technology is technology for transferring energy with no electrical wire by converting electrical energy into electromagnetic waves. In particular, for wireless transmission, electrical energy is converted into high-frequency electrical signals or light waves with specific frequencies, and then such electromagnetic waves are transmitted for energy transfer.

The wireless power transmission technology is divided into short-range wireless power transmission technology and long-range wireless power transmission technology. The short-range wireless power transmission technology is subdivided into a magnetic induction based method, where transmission is performed such that an induced current is generated by a nearby coil, and a magnetic resonance based method, where transmission is performed by matching the resonance frequencies of transmitting and receiving sides. The long-range wireless power transmission technology is subdivided into a microwave-based method, where power is converted into microwaves for transmission thereof, and a laser-based method, where power is converted into lasers for transmission thereof.

As described above, the short-range wireless power transmission technology has been developed enough to be applied to the wireless smartphone charging. In addition, relevant standards have been discussed. On the other hand, the long-range wireless power transmission technology has been researched for an unmanned aerial vehicle with a special purpose such as a military drone, but the maturity of the technology has not been fully reached.

Meanwhile, one of the issues related to the wireless power transmission technology is the effect of light exposure on living things or the harmfulness thereof when the light exposure occurs while wireless power is transmitted. Although many researches have been conducted, there is still no alternative or solution. Thus, the concern about wireless power transmission is still present.

DISCLOSURE

Technical Problem

To solve the above-described problem, the present disclosure proposes a wireless power transmission apparatus and method thereof.

An object of the present disclosure is to minimize or avoid the above-described human health problems caused by light exposure by preventing laser light from being exposed to living things including human bodies when a foreign object (FO) enters the path of the laser light before or while wireless power is transmitted.

Another object of the present disclosure is to reduce not only the load of a wireless power reception apparatus but the cost thereof by simplifying the configuration of the wireless power reception apparatus, and more particularly, by configuring a wireless power system such that no packet is exchanged, that is, no communication is required between a wireless power transmission apparatus and the wireless power reception apparatus while wireless power is transmitted in order to easily activate the wireless power system and improve the efficiency thereof.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure proposes a wireless power transmission apparatus and method thereof.

In an aspect of the present disclosure, provided is a wireless power transmission apparatus. The wireless power transmission apparatus may include a laser light source unit, a light output unit configured to output laser light generated by the laser light source unit to a light receiving unit of a wireless power reception apparatus for wireless charging, an FO detection unit configured to detect an FO using secondary light, and a control unit configured to control output of the laser light when the FO is detected by the FO detection unit.

It will be appreciated by persons skilled in the art that the objects that could be achieved with the present disclosure are not limited to what has been particularly described hereinabove and the above and other objects that the present disclosure could achieve will be more clearly understood from the following detailed description.

Advantageous Effects

The present disclosure has the following advantageous effects.

According to at least one embodiment of the present disclosure, laser light can be prevented from being exposed to living things including human bodies when an FO enters the path of the laser light before or while wireless power is transmitted, thereby minimizing or avoiding the human health problems caused by light exposure.

According to at least one embodiment of the present disclosure, not only the load of a wireless power reception apparatus but the cost thereof can be reduced by simplifying the configuration of the wireless power reception apparatus, and more particularly, by configuring a wireless power system such that no packet is exchanged, that is, no communication is required between a wireless power transmission apparatus and the wireless power reception apparatus while wireless power is transmitted, thereby easily activating the wireless power system and improving the efficiency thereof.

It will be appreciated by persons skilled in the art that the effects that could be achieved with the present disclosure are not limited to what has been particularly described hereinabove and other advantages of the present disclosure will be more clearly understood from the following detailed description.

BEST MODE

Figure 1:
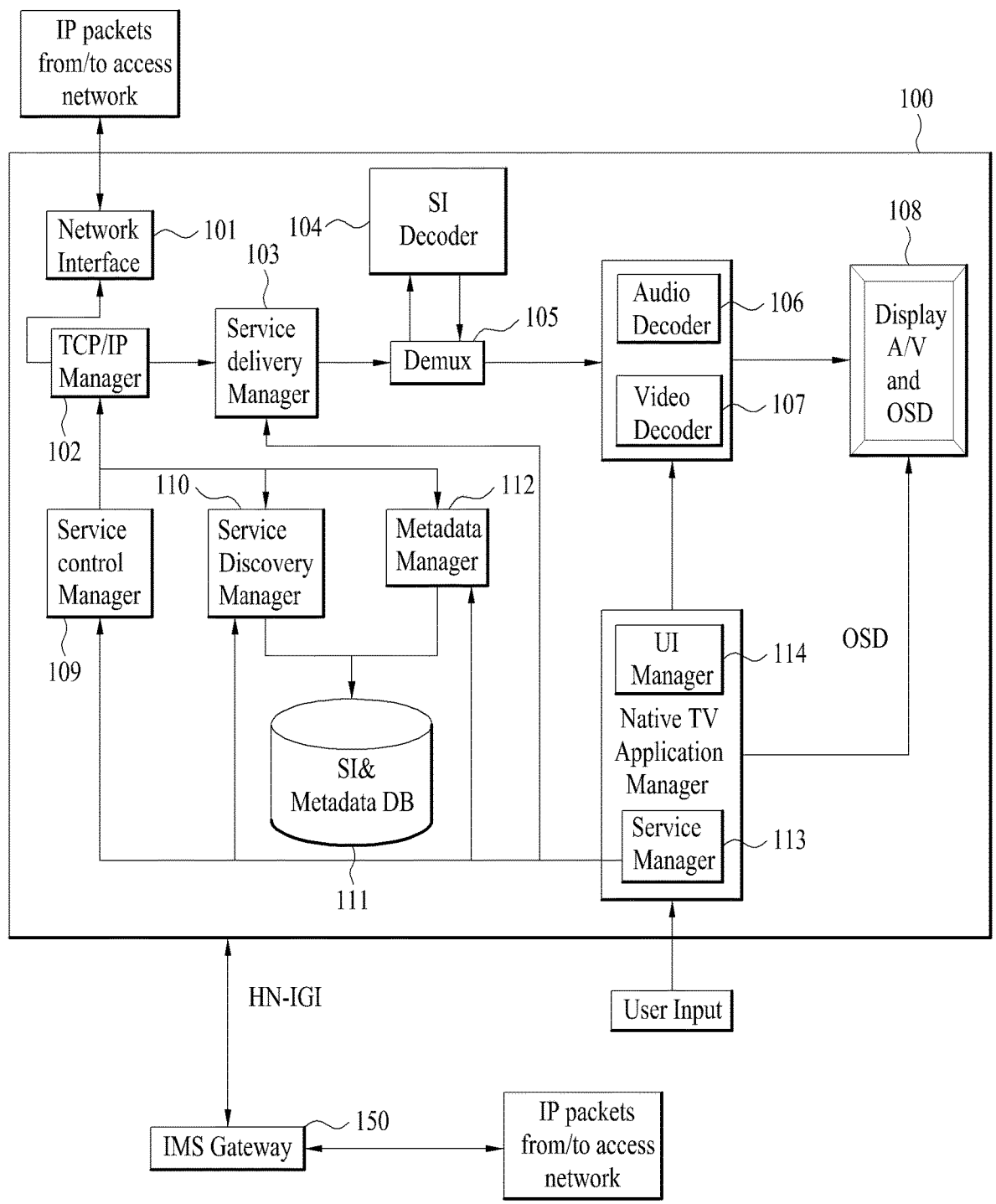
FIG. 1 is a diagram illustrating an embodiment of a wireless power reception apparatus according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

In general, a suffix such as "module" and "unit" may be used to refer to elements or components. Use of such a suffix herein is merely intended to facilitate description of the specification, and the suffix itself is not intended to give any special meaning or function.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following, a wireless power transmission apparatus and method thereof according to the present disclosure will be described in detail with reference to the attached drawings.

Wireless power transmission technology can be divided into short-range wireless power transmission technology based on magnetic induction and magnetic resonance; and long-range wireless power transmission technology based on microwaves and lasers in terms of distance. In addition, depending on whether there is contact, the wireless power transmission technology can be divided into contact-based wireless power transmission technology and non-contact-based wireless power transmission technology. The present disclosure will be described mainly based on the long-range and/or non-contact-based wireless power transmission technology for convenience and clarity of description. Although the scope of the long-range wireless power transmission technology may partially or completely overlap with that of the non-contact-based wireless power transmission technology, they may mean different technologies. The present disclosure is not limited to the long-range and/or non-contact-based wireless power transmission technology, that is, the disclosure is applicable to the short-range and/or contact-based wireless power transmission technology. In the following, the long-range and/or non-contact-based wireless power transmission technology is referred to as 'wireless power transmission technology' for convenience of description.

Although the wireless power transmission technology according to the present disclosure is described based on laser mode regardless of distance for convenience of description, the disclosure is not limited thereto. The laser mode uses a laser as a light source. However, a light source according to the present disclosure is not limited to a laser, and all light sources including a light emitting diode (LED) capable of generating a photon using electricity, etc. may replace the laser.

Meanwhile, when a laser light source is used, a near-infrared ray or infrared ray (IR) region is used since an ultra violet (UV) region is mostly absorbed in air and a visible ray region has visual issues.

In other words, various embodiments disclosed herein relate to wireless power transmission using laser light. In particular, the present disclosure provides a method of preventing laser light from being exposed to human bodies when a foreign object (FO) enters the path of the laser light before or while wireless power is transmitted in order to minimize or avoid the human health problems caused by light exposure and a method of reducing not only the load of a wireless power reception apparatus but the cost thereof by simplifying the configuration of the wireless power reception apparatus, and more particularly, by configuring a wireless power system such that no packet is exchanged, that is, no communication is required between a wireless power transmission apparatus and the wireless power reception apparatus while wireless power is transmitted in order to easily activate the wireless power system and improve the efficiency thereof.

The present specification mainly describes the wireless power transmission apparatus. Meanwhile, as a counterpart of the wireless power transmission apparatus, a wireless power reception apparatus may include all kinds of devices that require power charging for operation thereof such as a television (TV), an appliance, a smartphone, a mobile device including a wearable device, a lighting device, an electric vehicle, an electric razor, a (small) photovoltaic power generator, etc. However, for clarity, the present specification describes such a wireless power reception apparatus if necessary.

Figure 2:
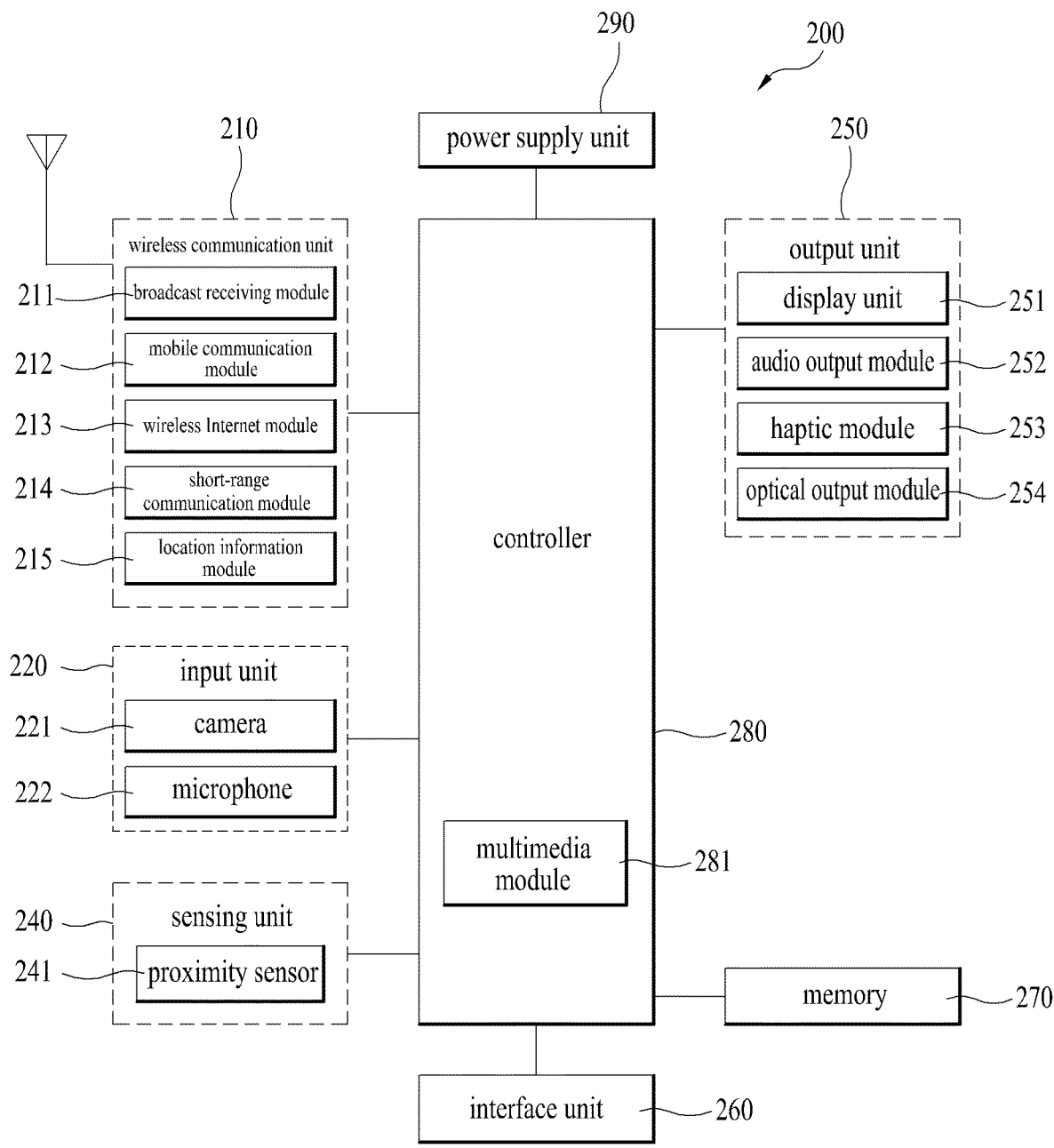
FIG. 2 is a diagram illustrating another embodiment of the wireless power reception apparatus according to the present disclosure.

FIGS. 1 and 2 illustrate the configurations of a TV and a mobile terminal as an example of the above-described wireless power reception apparatus. In the following, the TV and mobile terminal will be described in brief. It should be noted that the wireless power reception apparatus is not limited to the TV of FIG. 1 or the mobile terminal of FIG. 2.

FIG. 1 is a block diagram illustrating the configuration of a wireless power reception apparatus according to an embodiment of the present disclosure.

As described above, FIG. 1 shows a digital TV as an example of the wireless power reception apparatus.

'Digital TV' described in the present specification includes any device capable of performing at least one of transmission, reception, processing and output of contents for example. Here, the data includes, for example, all data related to content, services, and applications. The digital TV may transmit/receive data including the content to/from the server or the like through a wire/wireless network. If necessary, the data can be converted before transmission/reception. Examples of such TVs include Network TV, Hybrid Broadcast Broadband TV (HBBTV), Smart TV, and IPTV (Internet Protocol TV). 'Digital TV' described in the present specification may have include a signage having a display panel only or a SET type with another configuration such as a set-top box (STB) and the like.

Referring to FIG. 1, the digital TV 100 may include a network interface 101, a TCP/IP manager 102, a service delivery manager 103, an SI decoder 104, a demuxer or demultiplexer 105, an audio decoder 106, a video decoder 107, a display A/V and OSD (On Screen Display) module 108, a service control manager 109, a service discovery manager 110, a SI & metadata database (DB) 111, a metadata manager 112, a service manager 113, a UI manager 114, etc.

The network interface 101 may transmit/receive IP (internet protocol) packet(s) or IP datagram(s) (hereinafter named IP pack(s)) to/from the server 105 through a network. The IP packet (s) include data relating to services, applications, content, and so on. The network interface unit 101 may be a tuner for receiving a broadcast signal received through an RF (Radio Frequency), or may be a component including the tuner.

The TCP/IP manager 102 may involve delivery of IP packets transmitted to the digital TV 100 and IP packets transmitted from the digital TV 100, that is, packet delivery between a source and a destination. The TCP/IP manager 102 may classify received packet(s) according to an appropriate protocol and output the classified packet(s) to the service delivery manager 105, the service discovery manager 110, the service control manager 109, the metadata manager 112, and the like.

The service delivery manager 103 may be in charge of controlling the received service data. The service delivery manager 103 may control real-time streaming data, for example, using RTP/RTCP. In case of transmitting the real-time streaming data using RTP, the service delivery manager 103 may parse the received data packet according to the RTP and then transmits the parsed data packet to the demultiplexer 105 or save the parsed data packet to the SI & metadata DB 111 under the control of the service manager 113. The service delivery manager 103 may feed back the network reception information to the service providing server side using RTCP.

The demultiplexer 105 may demultiplex a received packet into audio data, video data, SI (System Information/Service Information/Signaling Information) data and the like and then transmit the demultiplexed data to the audio/video decoder 106/107 and the SI decoder 104, respectively.

The SI decoder 104 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 104 may save the decoded service informations to the SI & metadata DB 111. The saved service information can be used by being read by a corresponding component in response to a user's request for example.

The audio decoder 106 and the video decoder 107 may decode the demultiplexed audio data and the demultiplexed video data, respectively. The decoded audio and video data may be provided to the user through the display unit 108.

The application manager includes a service manager 113 and a user interface (UI) manager 114 and is able to perform a function of a controller of the digital TV 100. So to speak, the application manager can administrate the overall states of the digital TV 100, provide a user interface (UI), and manage other mangers.

The UI manager 114 provides a graphical user interface/user interface (GUI/UI) using OSD (on screen display) and the like. The UI manager 114 receives a key input from a user and then performs a device operation according to the input. For instance, if receiving a key input about a channel selection from a user, the UI manager 114 transmits the key input signal to the service manager 113.

The service manager 113 may control and manage service-related managers such as the service delivery manager 103, the service discovery manager 110, the service control manager 109, and the metadata manager 112.

The service manager 113 creates a channel map and controls a selection of a channel and the like using the created channel map in response to a key input received from the UI manager 114. The service manager 113 may receive service information from the SI decoder 104 and then sets an audio/video PID of a selected channel for the demultiplexer 105. Such a PID can be used for the demultiplexing procedure. Therefore, the demultiplexer 105 performs filtering (PID or section filtering) on audio data, video data and SI data using the PID.

The service discovery manager 110 may provide information required to select a service provider that provides a service. Upon receipt of a signal for selecting a channel from the service manager 113, the service discovery manager 110 searches for a service using the information.

The service control manager 109 may select and control a service. For example, the service control manager 109 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 109 may initialize and manage a session through the IMS gateway 250 using IMS (IP multimedia subsystem) and SIP (session initiation protocol). The protocols are exemplary, and other protocols are usable according to implementations.

The metadata manager 112 may manage metadata associated with services and save the metadata to the SI & metadata DB 111.

The SI & metadata DB 111 may store service information decoded by the SI decoder 104, metadata managed by the metadata manager 112, and information required to select a service provider, which is provided by the service discovery manager 110. In addition, the SI & metadata DB 111 can store system set-up data and the like for the system. The SI & metadata database 111 may be implemented with non-volatile RAM (NVRAM), flash memory and the like.

Meanwhile, an IMS gateway 250 is a gateway in which functions required for an access to an IMS based IPTV service are collected.

A power supply unit is configured to provide power to the above-described digital TV components. The power supply unit includes a wired interface required to provide power to the digital TV. In addition, the power supply unit includes a wireless power light-receiving interface not shown in the drawing) required to receive wireless power transmitted from the wireless power transmission apparatus according to the present disclosure. The wireless power light-receiving interface may be disposed on either the front or rear surface of the digital TV or implemented as a separate device outside the digital TV in order to provide power to the digital TV through a wired or wireless connector.

Referring to FIG. 2, a mobile terminal 200 is described as another example of the wireless power reception apparatus.

A mobile terminal is extended from a smartphone for generating and consuming communication content to a device for performing a variety of functions by interworking with various things. Such a mobile terminal may include a wearable device, that is, a device that a user can wear. For example, the wearable device may include not only devices such as a smart watch, smart glasses, a Head Mounted Display (HMD), an Eye Mounted Display (EMD), a Virtual Reality (VR) device, etc. and wearable products such as clothes, shoes, etc.

FIG. 2 is a block diagram illustrating the configuration of a wireless power reception apparatus according to another embodiment of the present disclosure.

Hereinafter, the mobile terminal will be described with reference to FIG. 2.

The mobile terminal 200 is shown having components such as a wireless communication unit 210, an input unit 220, a sensing unit 240, an output unit 250, an interface unit 260, a memory 270, a controller 280, and a power supply unit 290. It is understood that implementing all of the illustrated components in The FIG. 2A is not a requirement, and that greater or fewer components may alternatively be implemented.

More specifically, the wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server. Further, the wireless communication unit 210 typically includes one or more modules which connect the mobile terminal 200 to one or more networks.

To facilitate such communications, the wireless communication unit 210 includes one or more of a broadcast receiving module 211, a mobile communication module 212, a wireless Internet module 213, a short-range communication module 214, and a location information module 215.

The input unit 220 includes a camera 221 for obtaining images or video, a microphone 222, which is one type of audio input device for inputting an audio signal, and a user input unit 223 (for example, a touch key, a push key, a mechanical key, a soft key, and the like) for allowing a user to input information. Data (for example, audio, video, image, and the like) is obtained by the input unit 220 and may be analyzed and processed by controller 280 according to device parameters, user commands, and combinations thereof.

The sensing unit 240 is typically implemented using one or more sensors configured to sense internal information of the mobile terminal, the surrounding environment of the mobile terminal, user information, and the like. For example, the sensing unit 240 may alternatively or additionally include other types of sensors or devices, such as a proximity sensor 241 and an illumination sensor 242, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit 240, and in particular, information obtained from one or more sensors of the sensing unit 240, and combinations thereof.

The output unit 250 is typically configured to output various types of information, such as audio, video, tactile output, and the like. The output unit 250 is shown having a display unit 251, an audio output module 252, a haptic module 253, and an optical output module 254. The display unit 251 may have an inter-layered structure or an integrated structure with a touch sensor in order to facilitate a touch screen. The touch screen may provide an output interface between the mobile terminal 200 and a user, as well as function as the user input unit 223 which provides an input interface between the mobile terminal 200 and the user.

The interface unit 260 serves as an interface with various types of external devices that can be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 may perform assorted control functions associated with a connected external device, in response to the external device being connected to the interface unit 260.

The memory 270 is typically implemented to store data to support various functions or features of the mobile terminal 200. For instance, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the controller 280 to perform an operation (or function) for the mobile terminal 200.

The controller 280 typically functions to control overall operation of the mobile terminal 200, in addition to the operations associated with the application programs. The controller 280 may provide or process information or functions appropriate for a user by processing signals, data, information and the like, which are input or output, or activating application programs stored in the memory 270.

To drive the application programs stored in the memory 270, the controller 280 may be implemented to control a predetermined number of the components mentioned above in reference with FIG. 2A. Moreover, the controller 280 may be implemented to combinedly operate two or more of the components provided in the mobile terminal 200 to drive the application programs.

The power supply unit 290 can be configured to receive external power or provide internal power in order to supply appropriate power required for operating elements and components included in the mobile terminal 200. The power supply unit 290 may include a battery, and the battery may be configured to be embedded in the terminal body, or configured to be detachable from the terminal body. Meanwhile, similar to the power supply unit of the digital TV, a power supply unit 290 of the mobile terminal also includes a wireless power light-receiving interface (not shown in the drawing) required to receive wireless power transmitted from the wireless power transmission apparatus according to the present disclosure. The wireless power light-receiving interface may be disposed on either the front or rear surface of the mobile terminal or implemented as a separate device (e.g., a charger) outside the mobile terminal in order to provide power to the mobile terminal through a wired or wireless connector.

Hereinafter, the wireless power transmission apparatus and method thereof will be described in detail with reference to the attached drawings.

Figure 3:
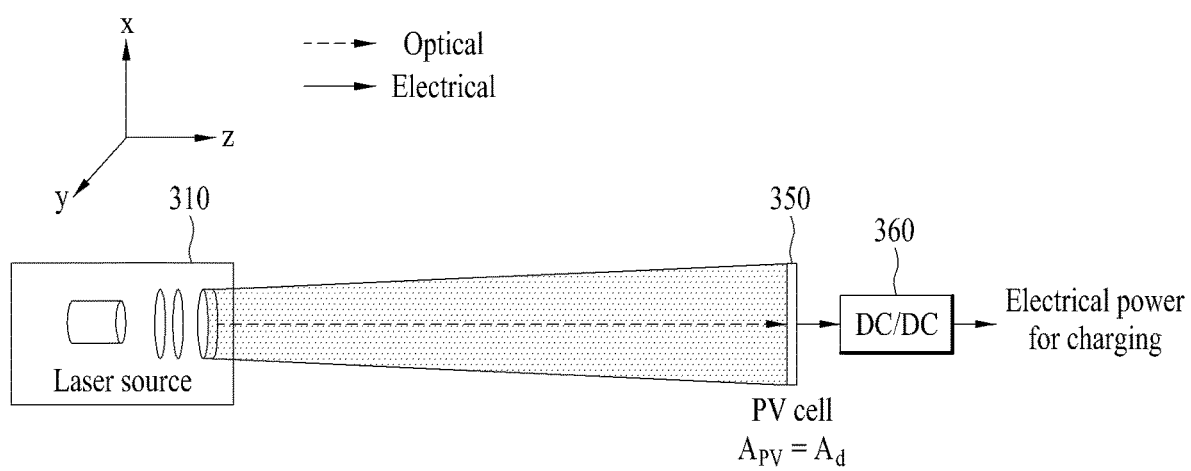
FIG. 3 is a diagram illustrating a wireless power transmission process according to the present disclosure.

FIG. 3 is a diagram illustrating a wireless power transmission process according to the present disclosure.

Referring to FIG. 3, a wireless power system may include a wireless power transmission apparatus (Tx) 310 and a wireless power reception apparatus (Rx).

The wireless power transmission apparatus (Tx) 310 may include at least one of the components which will be described later with reference to FIG. 4.

The wireless power reception apparatus (Rx) may include a light receiving unit configured to receive light emitted from the wireless power transmission apparatus (Tx) 310, that is, a PV cell 350 and a converter 360 (e.g., DC/DC).

In FIG. 3, a dotted line represents an optical signal, and a solid line represents an electrical signal.

Figure 4:
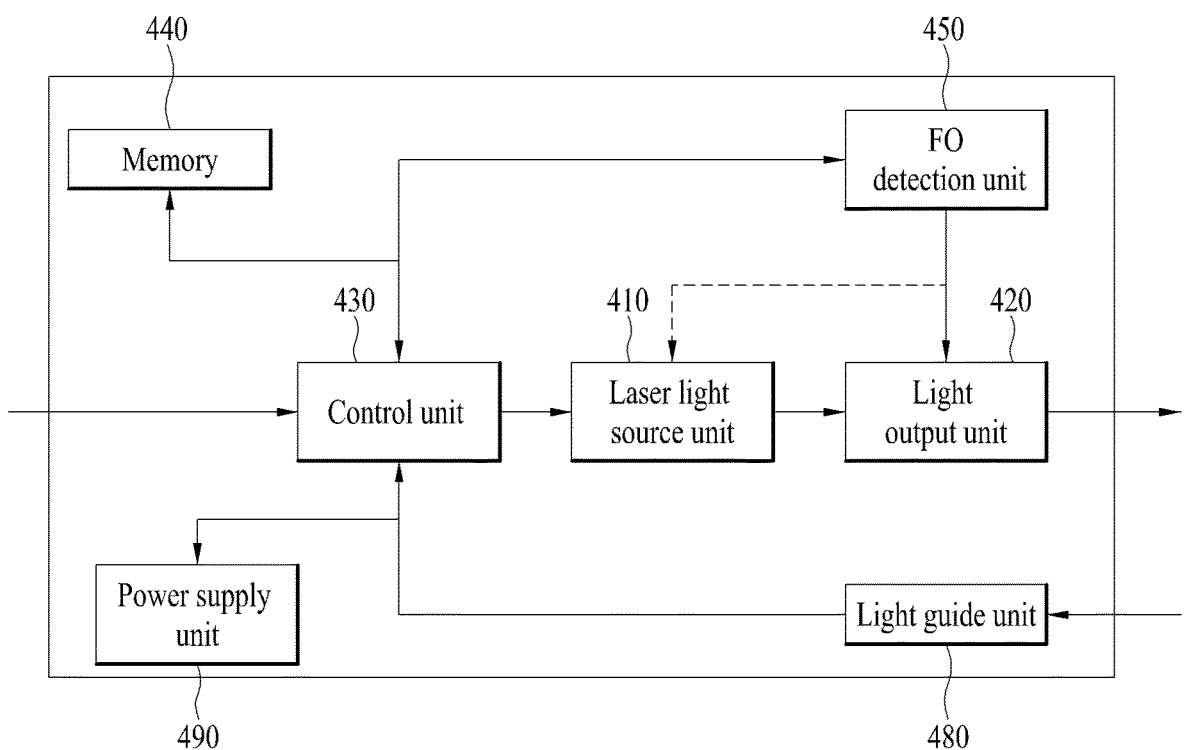
FIG. 4 is a block diagram illustrating the configuration of a wireless power transmission apparatus according to an embodiment of the present disclosure.

FIG. 4 is a block diagram illustrating the configuration of a wireless power transmission apparatus according to an embodiment of the present disclosure.

As described above, the long-range wireless power transmission technology using lasers attracts attention in that it can overcome the limitation of the power transmission range of the magnetic coupling technology (magnetic induction or resonance), which has been widely used in the wireless power transmission field.

According to the laser wireless power transmission technology, a wireless power reception apparatus (Rx) receives a laser emitted from a wireless power transmission apparatus (Tx) through a photoelectric device and then performs optical-to-electrical (O/E) conversion to provide power as shown in FIG. 3.

In the magnetic coupling technology, heat generation caused by Eddy currents, which are generated on a metal surface by a magnetic field created by a transmission coil of the wireless power transmission apparatus (Tx) according to Faraday's law and Lenz's law when an external metal object is inserted between the wireless power transmission apparatus (Tx) and the wireless power reception apparatus (Rx), is one of the main issues. On the other hand, in the laser wireless power transmission technology, since a laser with the high-density power is used, preventing living things, for example, humans, etc. from entering the path of the laser beam is one of the main issues.

Accordingly, the present disclosure provides a method of detecting the presence of an FO by monitoring or sensing the light variation of transmitted light reflected from a wireless power reception apparatus (Rx) without communication between a wireless power transmission apparatus (Tx) and the wireless power reception apparatus (Rx) and controlling wireless power transmission based on the detection result.

The wireless power transmission apparatus (Tx) according to an embodiment of the present disclosure may include a laser light source unit, a light output unit configured to output laser light generated by the laser light source unit to a light receiving unit of a wireless power reception apparatus for wireless charging, an FO detection unit configured to detect an FO using secondary light, and a control unit configured to control output of the laser light when the FO is detected by the FO detection unit. In addition, the wireless power transmission apparatus may further include an IR sensor unit configured to detect the FO.

The FO detection unit may include a light source configured to generate the secondary light and an optical configuration configured to output the generated secondary light. The optical configuration may be configured to receive reflected light, which is the output secondary light reflected by a retro-reflective surface of the wireless power reception apparatus.

Alternatively, the FO detection unit may include a light source configured to generate the secondary light and a beam splitter and a mirror configured to output the generated secondary light. The wireless power transmission apparatus may further include a photo diode (PD) array configured to receive reflected light, which is the secondary light output from the FO detection unit reflected by a retro-reflective surface of the wireless power reception apparatus.

Meanwhile, when the reflected light is received by the optical configuration or the PD array, the control unit may be configured to detect the FO based on a light amount of the received reflected light. When the light amount of the reflected light is less than a predetermined threshold or when no reflected light is received, the control unit may be configured to determine that the FO is detected and control the laser light not to be output.

The wireless power transmission apparatus may further include a guide light source configured to generate guide light for adjusting alignment between the output laser light and the light receiving unit of the wireless power reception apparatus and a mirror configured to transmit the generated guide light to the wireless power reception apparatus by reflecting the generated guide light. The secondary light may have a wavelength different from that of the laser light.

Referring to FIG. 4, the wireless power transmission apparatus (Tx) may include a laser light source unit 410, a light output unit 420, a control unit 430, and an FO detection unit 450.

The wireless power transmission apparatus (Tx) may further include at least one of a memory 440, a light guide unit 480, and a power supply unit 490.

Although not shown in the drawing, if necessary, some components may be removed or added for wireless power transmission, or the individual components may be modularized. For example, the function of the FO detection unit 450 may be performed by the control unit 430. Thus, it may be interpreted to mean that the control unit 430 includes the FO detection unit 450.

The laser light source unit 410 includes a light source configured to generate laser light for wireless power transmission. The generated laser light is emitted from the light output unit 420 and then received by the light receiving unit of the wireless power reception apparatus (Rx). The light radiation process may be controlled by the control unit 430.

The control unit 430 is configured to control the overall operation of the wireless power transmission apparatus (Tx). In particular, the control unit 430 is configured to control a wireless power transmission process, that is, control the laser light source unit 410 and the light output unit 420. More particularly, the control unit 430 is configured to control the wireless power transmission process based on an FO detection signal from the FO detection unit 450. Details will be described later.

The FO detection unit 450 is configured to detect whether an FO exists in the path of the laser light, which is emitted from the wireless power transmission apparatus (Tx) and received by the wireless power reception apparatus (Rx). Herein, the FO typically means living things such as human beings but may include nonliving things. The FO detection unit 450 is configured to transmit the detection result to the control unit 430 periodically or aperiodically. The control unit 430 may be configured to control the wireless power transmission apparatus (Tx) according to the detection result indicating the presence or absence of the FO, which is transmitted from the FO detection unit 450. When the wireless power transmission apparatus (Tx) is turned on, the FO detection unit 450 may be configured to detect the presence or absence of the FO and return the detection result to the control unit 430 periodically or aperiodically even though there is no laser light transmitted from the wireless power transmission apparatus (Tx) to the wireless power reception apparatus (Rx). Details of the FO detection unit 450 and FO detection methods will be described later.

The memory 440 is configured to store various data required for the wireless power transmission.

The power supply unit 490 is configured to provide power to each component of the wireless power transmission apparatus (Tx).

Although not shown in the drawing, the wireless power transmission apparatus (Tx) may further include a communication module and communicate with other devices through the communication module. For example, the wireless power transmission apparatus (Tx) may communicate with various devices including not only the wireless power reception apparatus (Rx) but another wireless power transmission apparatus (Tx), a server, an input means for controlling the wireless power transmission apparatus (Tx), etc. The communication module is configured to support data transmission of the wireless power transmission apparatus (Tx) and forward received data to the control unit 430. If necessary, the control unit 430 may be configured to control the wireless power transmission apparatus (Tx) based on the data received by the communication module.

The light guide unit 480 is configured guide the laser light emitted from the wireless power transmission apparatus (Tx) such that the laser light is properly aligned to the light receiving unit of wireless power reception apparatus (Rx). Here, the alignment may be required to improve the throughput or efficiency of the emitted laser light. Details of the light guide unit 480 will be described later.

Figure 5:
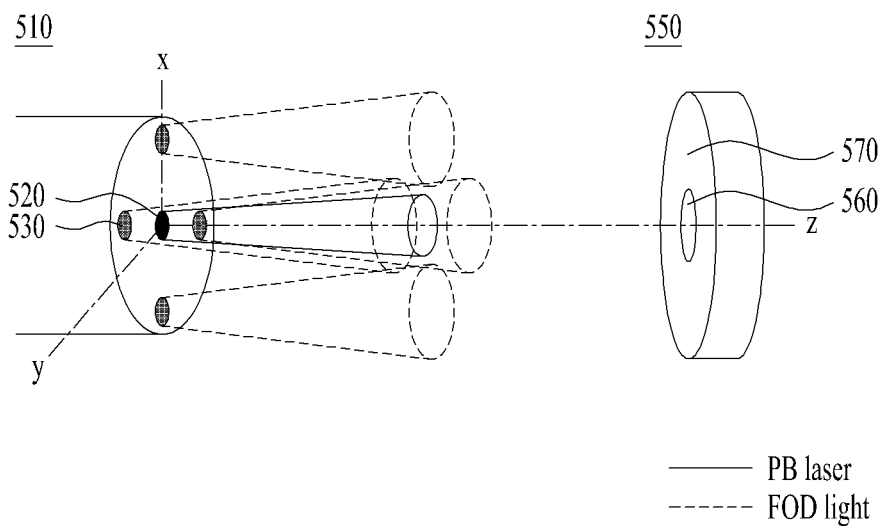
FIG. 5 is a diagram illustrating a side view of a wireless power system according to an embodiment of the present disclosure.
Figure 6:
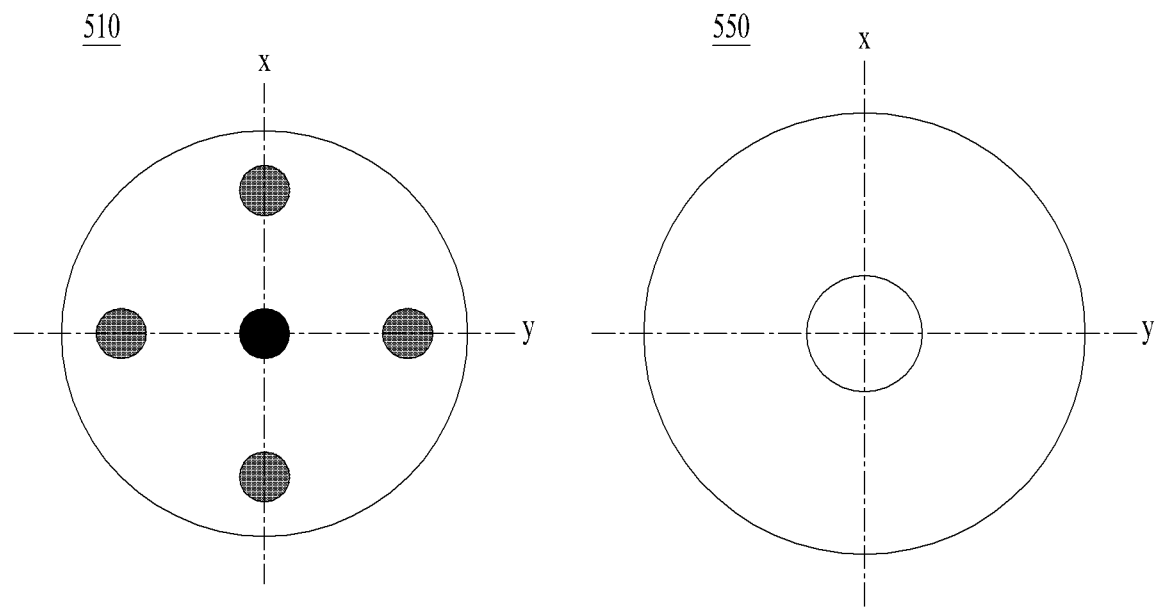
FIG. 6 is a diagram illustrating front views of a wireless power transmission apparatus (Tx) and a wireless power reception apparatus (Rx) constituting a wireless power system.

FIG. 5 illustrates a side view of a wireless power system according to an embodiment of the present disclosure, and FIG. 6 illustrates front views of a wireless power transmission apparatus (Tx) and a wireless power reception apparatus (Rx) constituting a wireless power system.

According to the present disclosure, the wireless power transmission apparatus (Tx) may include at least one laser light source for wireless power transmission, n secondary light sources for FO detection (where n is a positive integer), and an IR sensor. The at least one laser light source may be included in the laser light source unit of FIG. 4, and the n secondary light sources for the FO detection and IR sensor may be included in the FO detection unit 450 of FIG. 4. However, instead of the IR sensor, the FO detection unit 450 may include a different sensor configured to perform a similar function to that of the IR sensor.

Each of the n secondary light sources for the FO detection may not be a laser light source. For example, the n secondary light sources for the FO detection are used to detect an FO unlike the laser light source for wireless charging, and thus other light sources such as an LED may be used by considering the purpose, cost, etc. A plurality of secondary light sources are not mandatory. That is, one or more secondary light sources may be used. When there are multiple secondary light sources, all secondary light sources do not need to emit light at the same time. Specifically, the secondary light sources may emit light one-by-one, or some of them may be turned on. In addition, the secondary light sources may be different types of light sources. Further, the secondary light source may not be a light source, that is, it may be replaced with a sensor capable of detecting an FO.

The laser light emitted from the laser light source should be received by a light receiving unit 560 of the wireless power reception apparatus (Rx), i.e., a PV cell, but the light emitted from the secondary light source for the FO detection may not be received by the light receiving unit 560. Specifically, the light generated by the secondary light source (hereinafter referred to as 'secondary light') is emitted to a retro-reflective surface 570 of the wireless power reception apparatus (Rx). Thereafter, the light is reflected by 180 degrees, that is, in the direction opposite to its moving direction and returned to the wireless power transmission apparatus (Tx). The returned secondary light is received by the FO detection unit 450 and reported to the control unit 430. In this case, the wavelength of the laser light for the wireless charging is significantly different from that of the secondary light for the FO detection.

Although not shown in the drawing, the secondary light source for the FO detection may use the laser light generated by the laser light source. However, the output power of the laser light may be reduced such that there is no harmful effect on the FO even though the laser light reaches the FO. In other words, the power of the laser light may be reduced such that the laser light is suitable for the FO detection. For example, when the wireless power transmission apparatus is turned on or before the wireless power transmission apparatus transmits the laser light for the wireless charging after turned on, the wireless power transmission apparatus may transmit the laser light by adjusting the power thereof to be suitable for the FO detection. Thereafter, if there is no detected FO, the wireless power transmission apparatus may increase the power of the laser light for the wireless charging and then transmit the laser light to the light receiving unit of the wireless power reception apparatus. However, in this case, since the laser light for the wireless charging may be transmitted to the light receiving unit of the wireless power reception apparatus, at least one laser light source may be further equipped for the FO detection as shown in FIG. 5.

Meanwhile, the one or more secondary light sources may be provided in the form of a cylinder to implement a secondary light source unit as shown in FIG. 5. The secondary light sources may be rotated for the FO detection.

FIG. 6 is a diagram illustrating front cross-sectional views of a laser light source configuration 520 and a secondary light source configuration 530 of the wireless power transmission apparatus and front cross-sectional views of the PV cell 560 and the retro-reflective surface 570.

However, the shapes and configurations of a wireless power transmission apparatus 510 and a wireless power reception apparatus 550 are not intended to limit the scope of the present disclosure.

Figure 7:
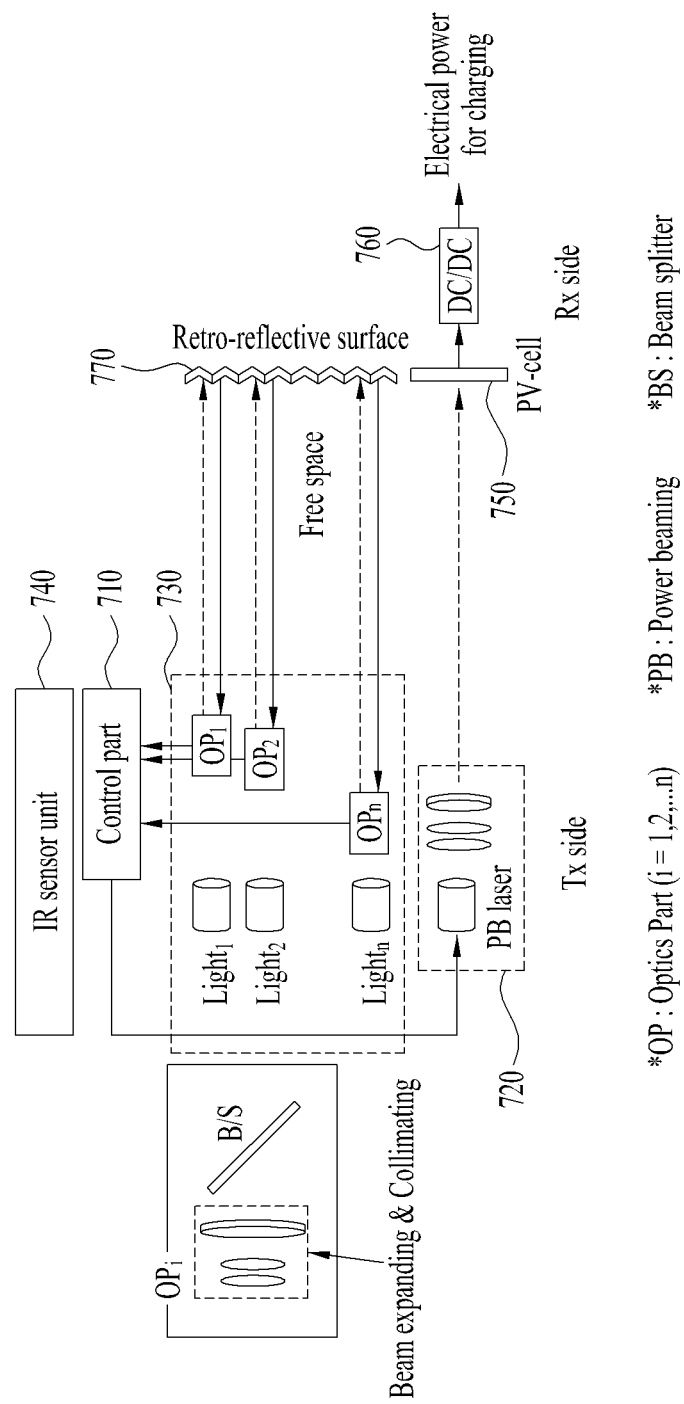
FIG. 7 is a block diagram illustrating the configuration of a laser wireless power system implemented according to an embodiment of the present disclosure.
Figure 8:
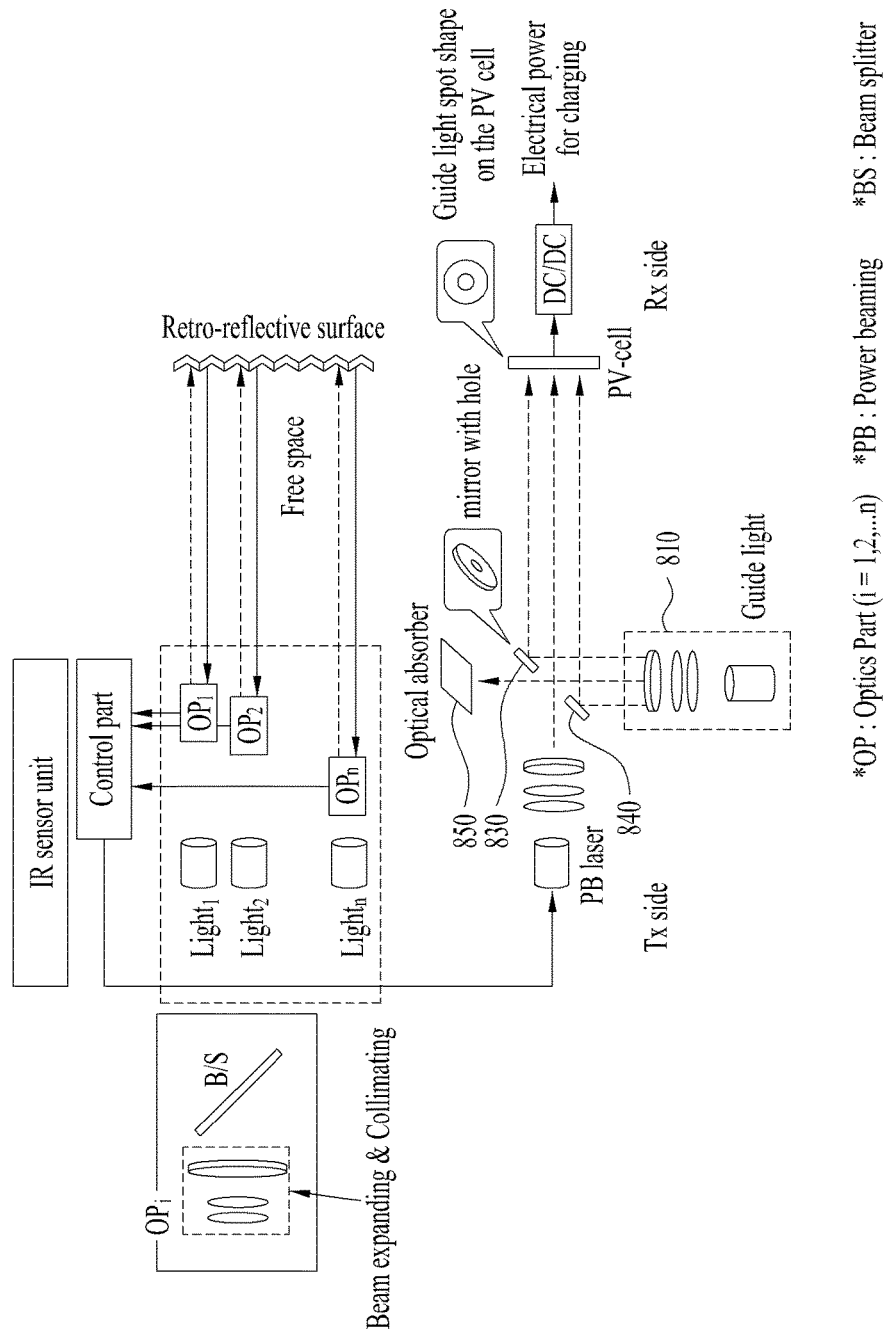
FIG. 8 is a block diagram illustrating the configuration of a laser wireless power system implemented according to another embodiment of the present disclosure.

FIG. 7 is a block diagram illustrating the configuration of a laser wireless power system implemented according to an embodiment of the present disclosure, and FIG. 8 is a block diagram illustrating the configuration of a laser wireless power system implemented according to another embodiment of the present disclosure.

Referring to FIG. 7, a wireless power transmission apparatus includes a control unit 710, a laser light source unit 720, and a secondary light source unit 730 (or an FO detection unit). In this case, the wireless power transmission apparatus may further include an IR sensor unit 740.

Continuing to refer to FIG. 7, a wireless power reception apparatus includes a PV cell 750, a conversion unit 760, and a retro-reflective surface 770.

The control unit 710 is configured to control a wireless power transmission process when the wireless power transmission apparatus is turned on or when a wireless power transmission request is received.

The laser light source unit 720 is configured to generate and emit laser light for wireless charging under control of the control unit 710. The PV cell 750 is configured to receive the laser light for the wireless charging and converts it to an electrical signal. The conversion unit 760 is configured to perform DC/DC conversion to provide power to products. The laser light source unit 720 may be implemented with a laser source and at least one lens, but the present disclosure is not limited thereto.

The secondary light source unit 730 is configured to emit secondary light into a space. In this case, the secondary light may be emitted in the direction in which the laser light is emitted and/or in the vicinity of the space. The secondary light source unit 730 may be implemented with at least one light source and an optics part (OP) set. For convenience of description, the light source and OP set are called together a sub-light source. First secondary light (secondary light 1) generated by a first light source (light source 1) is emitted into the space after passing through a first OP (OP 1). In other words, the secondary light source unit 730 may be equipped with n sub-light sources each including a light source and an OP. As described above, n may be a positive integer, that is, the value of n may be greater than or equal to 1.

The OP of each sub-light source may be implemented by combining expanding and collimating lenses, a beam splitter (B/S), etc.

After passing through the OP of the sub-light source (OPi), the secondary light is emitted into the space between the wireless power transmission apparatus and the wireless power reception apparatus. In particular, the secondary light is received again by the OP of the sub-light source (OPi) after being reflected by the retro-reflective surface 770.

The OP of the sub-light source is configured to check the light amount of the received secondary light, i.e., the light amount of the reflected light and transmit it to the control unit 710. The control unit 710 may be configured to detect an FO by receiving data on the light amount of the reflected light from the OP of each sub-light source included in the secondary light source unit 730. However, the control unit 710 may be configured to autonomously check the light amount of the reflected light.

In addition, the control unit 710 may be configured to calculate the approximate location, moving speed and moving direction of the FO detected by the OP of each sub-light source (OPi).

After detecting the presence of the FO, the control unit 710 may be configured to control whether to emit the laser light for the wireless charging or whether to turn on/off the currently emitted laser light.

Hereinafter, it is assumed that the secondary light source unit 730 includes 5 sub-light sources, that is, first to fifth sub-light sources, each of which includes a light source and an OP set.

The control unit 710 controls the secondary light source unit 730 such that the secondary light is emitted before the laser light for the wireless charging is emitted. The secondary light source unit 730 emits the secondary light through each of the first and fifth sub-light sources. Then, after receiving the reflected light reflected by the retro-reflective surface 770 of the wireless power reception apparatus, the secondary light source unit 730 transmits data on the light amount to the control unit 710. The control unit 710 determines whether there is an FO based on the light amount data received from the secondary light source unit 730. When determining that the FO enters the light path between the wireless power transmission apparatus and the wireless power reception apparatus, the control unit 710 controls the output of the laser light for the wireless charging such that the laser light is no longer transmitted from the wireless power transmission apparatus to the wireless power reception apparatus. When it is said that the control unit 710 controls the laser light such that it is not emitted, it may mean that the control unit 710 does not emit the laser light if the laser light is not currently emitted or stops emitting the laser light if the laser light is currently emitted. In other words, when detecting the presence of the FO, the control unit 710 controls all cases regarding the laser light for the wireless charging in order to prevent the laser light from being emitted to living things.

For example, the light amount data may be a ratio of the reflected light to the secondary light. Meanwhile, the control unit 710 may determine that the FO enters the light path only when it is determined based on the light amount data that a difference between the reflected light and the secondary light is less than a predetermined threshold. Since the secondary and reflected light are emitted into a free space and reflected by the retro-reflective surface, there may be a loss in the light amount due to the free space and the retro-reflective surface, and the control unit 710 should not determine that such a loss is caused by the FO.

Meanwhile, when the sub-light sources in the secondary light source unit 730 are arranged such that they have different distances from the laser light source unlike FIG. 5 or 6, the control unit 710 may not stop emitting the laser light for the wireless charging even if the presence of the FO is detected by one sub-light source.

For example, when the light amount data received from the first sub-light source indicates that the FO is present but the light amount data received from the fifth sub-light source indicates that there is no FO, the control unit 710 may not stop emitting the laser light for the wireless charging. However, in this case, regarding the presence of the FO, which is determined based on the light amount data from the first sub-light source, it is difficult for the control unit 710 to determine whether the FO enters the path of the laser light or not since it is far away from the path of the laser light and the outermost of the path of the laser light. If the control unit 710 stops emitting the laser light immediately, a large amount of time is required to restart the radiation of the laser light after determining the presence or absence of the FO again, and as a result, it may degrade the overall efficiency of the wireless power system.

Thus, in this case, the control unit 710 may notify the FO that enters the path of the first sub-light source to prohibit the FO from entering the path of the laser light. Thereafter, if it is determined based on the light amount data from a next sub-light source that the FO still exists in the path of the laser light, the control unit 710 may stop emitting the laser light for the wireless charging. Here, the next light source may be any one of the second to fifth sub-light sources.

To notify the FO, the sub-light source may perform one of the following operations: emitting visible light, changing the wavelength of the secondary light, flickering the secondary light, and outputting a sound.

Although not shown in the drawing, the control unit 710 may use various methods to determine the presence of the FO based on the light amount data from the sub-light source and control the laser light for the wireless charging.

When the FO enters the path of the laser light, at least one of the sub-light sources may receive no reflected light since the secondary light may fail to reach the retro-reflective surface but be reflected by the FO. In this case, the control unit 710 may use the above-described mechanism for controlling the laser light for the wireless charging.

The IR sensor unit 740 is configured to assist FO detection, and more particularly, detect an FO when it is difficult to perform the FO detection through the secondary light source unit 730. When it is said that the FO detection is difficult to be performed by the secondary light source unit 730, it may mean that the FO exists in the vicinity of the wireless power transmission apparatus or in a space except the path of the secondary light emitted from the secondary light source unit 730.

FIG. 8 is a diagram illustrating an embodiment in which a light guide unit is added to the embodiment of FIG. 7.

Thus, the same parts which have been described with reference to FIG. 7 are not described below with reference to FIG. 8.

In FIG. 8, laser light generated by a laser light source unit is emitted to a PV cell of a wireless power reception apparatus. In this case, if the emitted laser light is not perfectly aligned with the PV cell, the reception to transmission ratio of the laser light or the throughput of the PV cell may be degraded. However, it is difficult for a user using the wireless power system to recognize the degradation. Accordingly, the light guide unit may be used to adjust the alignment between the laser light and the PV cell.

The light guide unit may include a guide light source 810, a lens unit 820, mirrors 830 and 840, and a light absorption unit 850. Some components of the light guide unit may be modularized or removed, or other components not shown in the drawing may be further included in the light guide unit or added to support the light guide unit.

The light guide source 810 is configured to generate guide light for adjusting the alignment between the laser light and the PV cell. The generated guide light is emitted to the mirrors 830 and 840 after passing through the lens unit 820. By means of the mirrors 830 and 840, the guide light is emitted to the PV cell in parallel to the laser light. Each of the mirrors 830 and 840 may have a hole and use the hole to adjust the alignment compared to a guide light spot shape provided in the PV cell. Meanwhile, the light absorption unit 850 is configured to absorb the rest of the guide light except the guide light emitted and reflected by the mirrors 830 and 840. The alignment between the laser light and PV cell may be adjusted automatically or manually. To automatically adjust the alignment, a means capable of changing an angle, etc. may be provided to the laser light source unit. This process may be controlled by a control unit.

Figure 9:
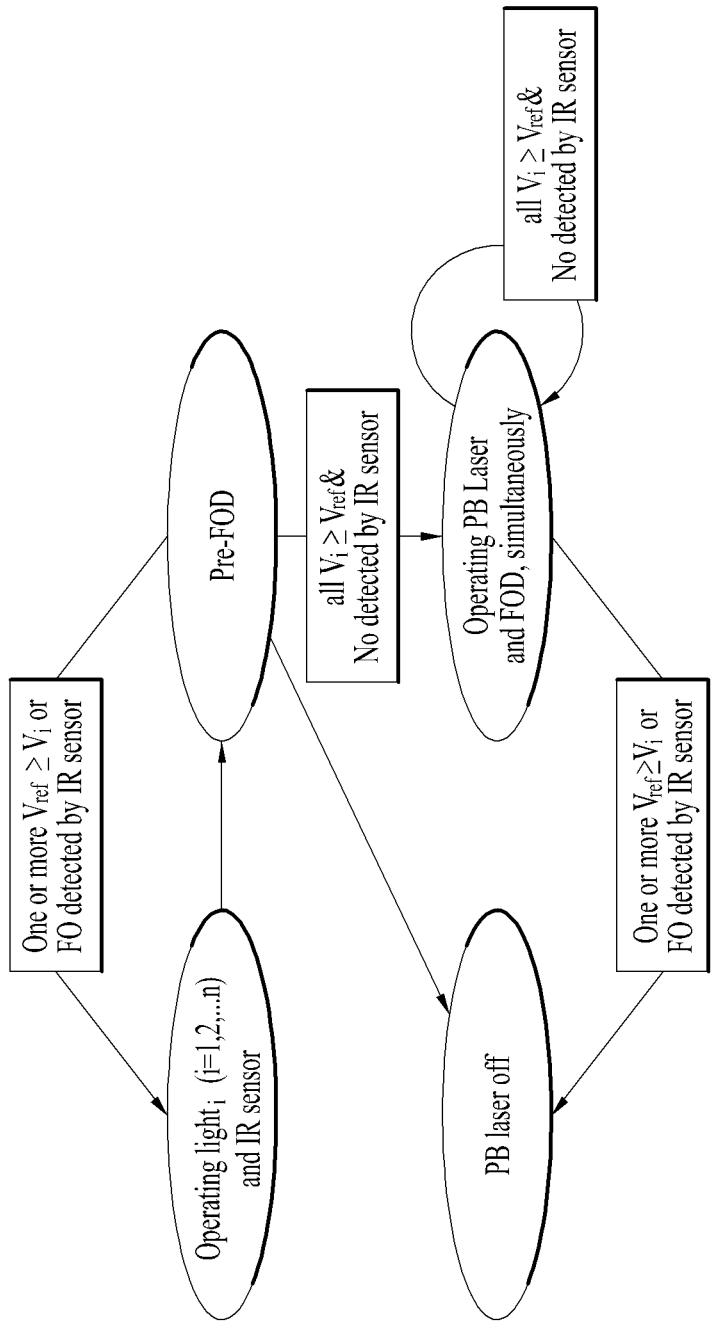
FIG. 9 is a diagram illustrating the operating sequence of a laser wireless power system according to an embodiment of the present disclosure.

FIG. 9 is a diagram illustrating the operating sequence of a laser wireless power system according to an embodiment of the present disclosure.

Referring to FIG. 9, as an example of the operating sequence of the wireless power system according to the present disclosure, pre-FO detection (pre-FOD) is performed to determine whether an FO enters before transmission of laser light for wireless charging by driving secondary light i for detecting the FO and an IR sensor without radiation of the laser light.

The pre-FOD process is performed to prevent the laser light from being emitted to living things even during a very short time when the FO (e.g., living thing) enters the path of the laser light.

When it is determined that there is no FO, a control unit operates a laser light source unit for the wireless charging such that the laser light is transmitted to a light receiving unit of a wireless power reception apparatus. While the laser light is transmitted to the light receiving unit of the wireless power reception apparatus, the control unit performs FOD continuously or periodically/aperiodically.

On the other hand, when it is determined that the FO exists, the control unit does not operate the laser light source unit for the wireless charging. The control unit does not operate the laser light source unit until it is determined by the FOD process that there is no FO.

Meanwhile, if there is no detected FO while the laser light for the wireless charging is transmitted to the PV cell of the wireless power reception apparatus, the control unit continues to perform the transmission of the laser light and the FOD together.

On the contrary, if the FO is detected while the laser light for the wireless charging is transmitted to the PV cell of the wireless power reception apparatus, the control unit controls the laser light source unit such that the laser light source unit stops transmitting the laser light, that is, the laser light is no longer emitted to the FO. Thus, after performing this operation, the control unit returns to the pre-FOD state for the FOD.

Figure 10:
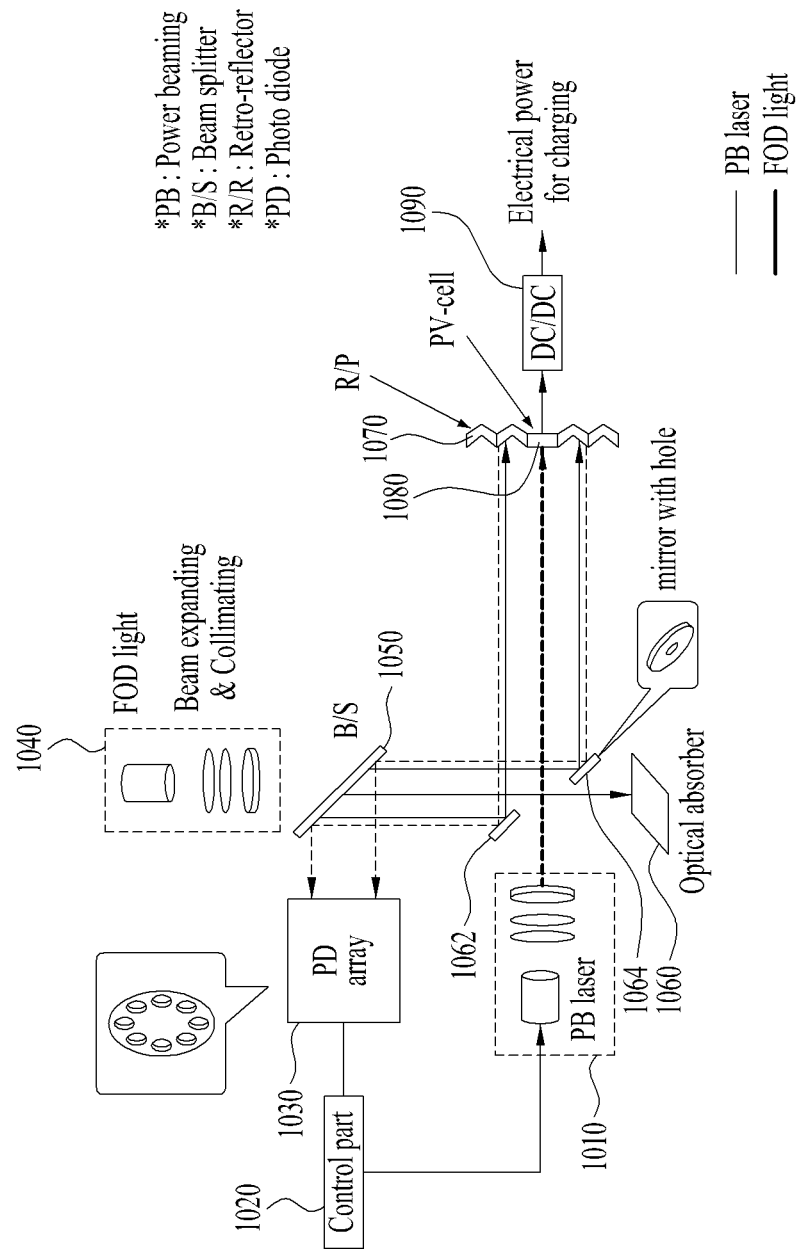
FIG. 10 is a block diagram illustrating the configuration of a laser wireless power system implemented according to a further embodiment of the present disclosure.

FIG. 10 is a block diagram illustrating the configuration of a laser wireless power system implemented according to a further embodiment of the present disclosure.

The wireless power system shown in FIG. 10 is different from those shown in FIGS. 7 and 8. In the following, the same parts which have been described above with reference to FIG. 7 or 8 are not described, but different parts are described in detail with reference to FIG. 10.

Referring to FIG. 10, a wireless power transmission apparatus includes a laser light source unit 1010, a control unit 1020, and an FO detection unit. In this case, the wireless power transmission apparatus may further include a PD array 1030. Although the PD array 1030 may be included in the FO detection unit, they are assumed to be different components as shown in the drawing for convenience of description. However, the present disclosure is not limited thereto. Meanwhile, a wireless power reception apparatus may have the same configuration as described in the embodiments.

Hereinafter, the FO detection unit and PD array 1030 will be described in detail except the laser light source unit 1010 and the control unit 1020.

The FO detection unit may include an FO light source unit 1040, a B/S 1050, mirrors 1062 and 1064, and a light absorption unit 1060. The FO light source unit 1040 may be implemented with an FO light source and beam expanding and collimating lenses. Some components of the FO detection unit may be modularized. Alternatively, some of the illustrated components may be removed, or some components not shown in the drawing may be added.

Unlike laser light, FO light (i.e., secondary light) generated by the FO light source of the FO light source unit 1040 passes through the beam expanding and collimating lenses, is split by the B/S 1050, and is then emitted to the mirrors 1062 and 1064. The mirrors 1062 and 1064 reflect the FO light such that the FO light is emitted to a retro-reflective surface 1070 of the wireless power reception apparatus.

The emitted FO light is reflected by the retro-reflective surface 1070 of the wireless power reception apparatus, and the reflected light is emitted back to the B/S 1050 in the direction opposite to the path of the FO light. The B/S reflects the reflected light such that the light is transmitted to the PD array 1030, and the PD array 1030 transmits the reflected light to the control unit 1020. In this case, the control unit 1020 or the PD array 1030 may determine whether an FO enters the path of the laser light by checking the light amount of the reflected light as described above.

The control unit 1020 monitors a variation in the light amount received by each PD of the PD array 1030. If at least one of the output values of the PDs is less than a threshold, the control unit 1020 stops operating the laser light source unit 1010 to control the radiation of the laser light for wireless charging.

Meanwhile, if OPi of FIG. 7 and the angles of the mirrors of FIG. 10 are controlled and a retro-reflective surface corresponding thereto is provided, the presence of an FO may be determined in a wide range.

Figure 11:
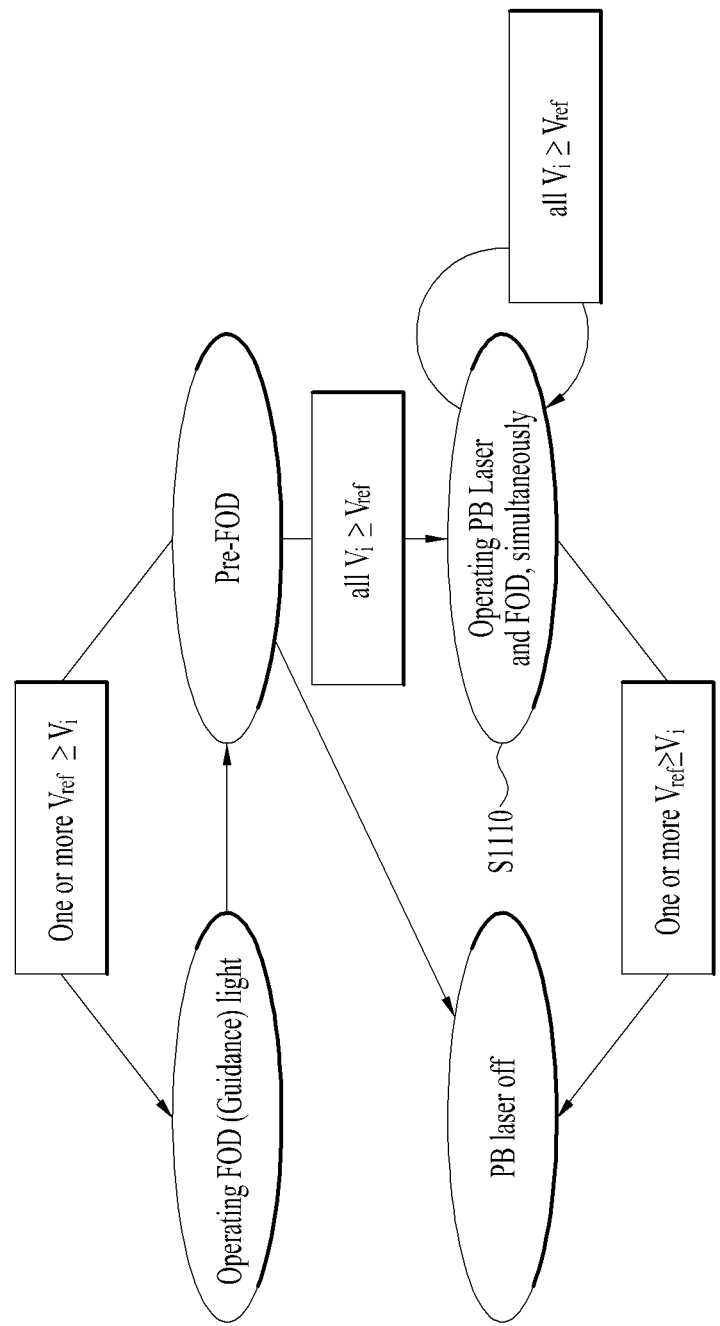
FIG. 11 is a diagram illustrating the operating sequence of a laser wireless power system according to still a further embodiment of the present disclosure.

FIG. 11 is a diagram illustrating the operating sequence of a laser wireless power system according to still a further embodiment of the present disclosure.

Since the operating sequence of FIG. 11 is almost the same as that of FIG. 9, only different parts are described in detail with reference to FIG. 11.

FIG. 11 is different from FIG. 9 in that FIG. 9 shows that the sub-light source and the IR sensor are used but FIG. 11 shows that FO light is emitted.

Figure 12:
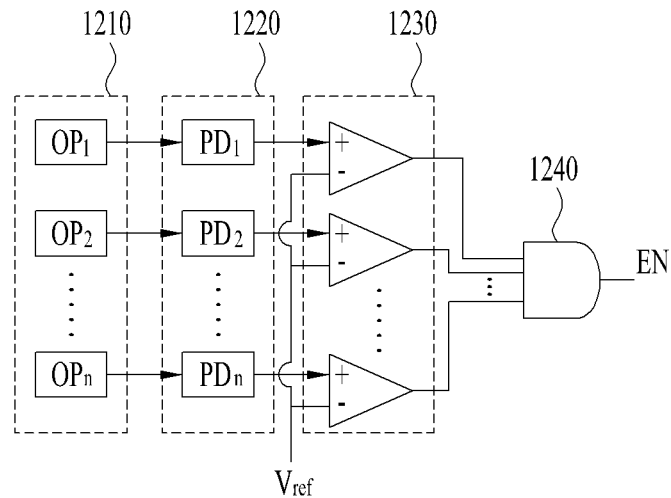
FIG. 12 is a block diagram illustrating the configuration of a wireless power transmission apparatus according to an embodiment of the present disclosure.
Figure 13:
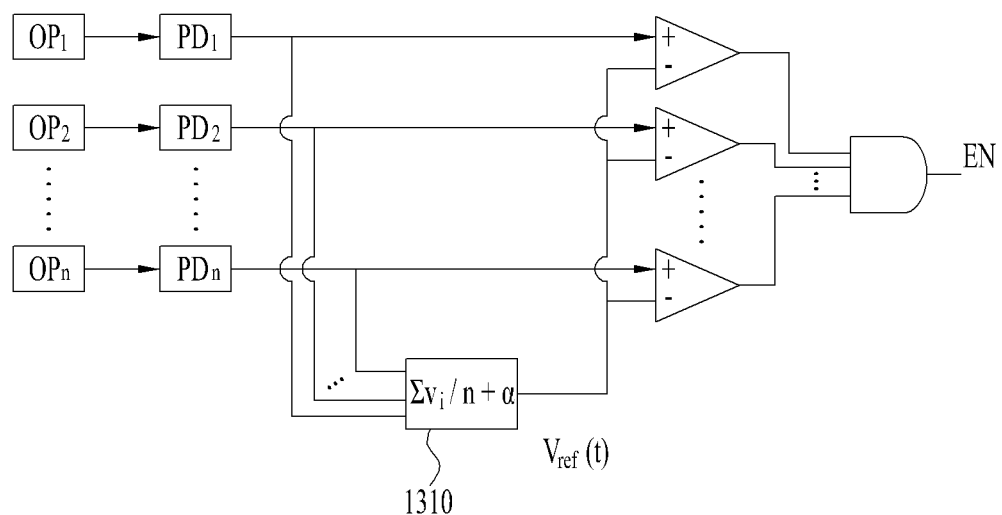
FIG. 13 is a block diagram illustrating the configuration of a wireless power transmission apparatus according to another embodiment of the present disclosure.

FIG. 12 is a block diagram illustrating the configuration of a wireless power transmission apparatus according to an embodiment of the present disclosure, and FIG. 13 is a block diagram illustrating the configuration of a wireless power transmission apparatus according to another embodiment of the present disclosure.

Each of FIGS. 12 and 13 shows the configuration of a control unit of each wireless power transmission apparatus.

As described above, whether an FO enters the path of laser light for wireless charging is determined using secondary light, FO light, an IR sensor, etc., and based on the determination result, the radiation of the laser light for the wireless charging is controlled.

Referring to FIGS. 12 and 13, $V_i$ is determined by $PD_i$ based on the light amount emitted from $OP_i$ (where i=1, 2, . . . , n). In the drawings, $V_{ref}$ denotes a threshold.

If all $V_i$ is greater than or equal to $V_{ref}$, the control unit determines that there is no FO in the path of the laser light for the wireless charging. Thus, the control unit controls the laser light to be continuously emitted by continuing to operate a laser light source unit for the wireless charging.

Meanwhile, if at least one $V_i$ is less than $V_{ref}$, the control unit determines that an FO enters the path of the laser light for the wireless charging. Thus, to prevent the laser light from being emitted to the FO, the control unit controls the laser light source unit such that the laser light is no longer emitted.

In FIG. 12, $V_{ref}$ is a predetermined voltage level, and In FIG. 13, $V_{ref}$ is a voltage level obtained by adding the average of $V_i$, which is calculated in real time by considering a variation in the intensity of background light such as external light, to a predetermined margin value ($\alpha$). This may be applied to FIG. 9 or 11.

According to the wireless power transmission apparatus and method thereof described with reference to various embodiments of the present disclosure, laser light can be prevented from being exposed to living things including human bodies when an FO enters the path of the laser light before or while wireless power is transmitted, thereby minimizing or avoiding the human health problems caused by light exposure. In addition, not only the load of a wireless power reception apparatus but the cost thereof can be reduced by simplifying the configuration of the wireless power reception apparatus, and more particularly, by configuring a wireless power system such that no packet is exchanged, that is, no communication is required between a wireless power transmission apparatus and the wireless power reception apparatus while wireless power is transmitted, thereby easily activating the wireless power system and improving the efficiency thereof.

It will be appreciated by those skilled in the art that the present disclosure may be carried out in other specific ways than those set forth herein without departing from the essential characteristics of the present disclosure.

The above embodiments are therefore to be construed in all aspects as illustrative and not restrictive. The scope of the disclosure should be determined by the appended claims and their legal equivalents and all changes coming within the meaning and equivalency range of the appended claims are intended to be embraced therein.

MODE FOR INVENTION

Various embodiments for carrying out the invention have been described in BEST MODE FOR INVENTION

INDUSTRIAL APPLICABILITY

Since the wireless power technology according to the present disclosure can be applied to various devices, the industrial applicability thereof is acknowledged.

The invention claimed is:

1. A wireless power transmission apparatus, comprising:
a laser light source unit;
a light output unit configured to output laser light generated by the laser light source unit to a light receiving unit of a wireless power reception apparatus for wireless charging;
a Foreign Object (FO) detection unit configured to detect an FO using secondary light;
a light source configured to generate the secondary light;
a beam splitter and a mirror configured to output the generated secondary light;
a photo diode (PD) array configured to receive reflected light; and
a control unit configured to control output of the laser light when the FO is detected by the FO detection unit,
wherein the reflected light is the secondary light output from the FO detection unit reflected by a retro-reflective surface of the wireless power reception apparatus, and
wherein the mirror includes a hole in the middle, and the generated secondary light and the reflected light are reflected at a periphery and not at the middle of the mirror.

2. The wireless power transmission apparatus of claim 1, further comprising an infrared ray (IR) sensor unit configured to detect the FO.

3. The wireless power transmission apparatus of claim 1, wherein the FO detection unit comprises:
the light source configured to generate the secondary light; and
an optical configuration configured to output the generated secondary light, and including the beam splitter and the mirror.

4. The wireless power transmission apparatus of claim 3, wherein the optical configuration is configured to receive the reflected light.

5. The wireless power transmission apparatus of claim 4, wherein when the reflected light is received by the optical configuration or the photo diode (PD) array, the control unit is configured to detect the FO based on a light amount of the received reflected light.

6. The wireless power transmission apparatus of claim 5, wherein when the light amount of the reflected light is less than a predetermined threshold or when no reflected light is received, the control unit is configured to determine that the FO is detected and control the laser light not to be output.

7. The wireless power transmission apparatus of claim 1, further comprising:
a guide light source configured to generate guide light for adjusting alignment between the output laser light and the light receiving unit of the wireless power reception apparatus; and
a mirror configured to transmit the generated guide light to the wireless power reception apparatus by reflecting the generated guide light.

8. The wireless power transmission apparatus of claim 1, wherein the secondary light has a wavelength different from that of the laser light.

9. The wireless power transmission apparatus of claim 1, wherein when the reflected light is received by an optical configuration or the photo diode (PD) array, the control unit is configured to detect the FO based on a light amount of the received reflected light.

10. The wireless power transmission apparatus of claim 9, wherein when the light amount of the reflected light is less than a predetermined threshold or when no reflected light is received, the control unit is configured to determine that the FO is detected and control the laser light not to be output.

11. The wireless power transmission apparatus claim 1, further comprising an optical absorber that absorbs the generated secondary light that passed through the hole in the middle of the mirror.

12. The wireless power transmission apparatus of claim 11, wherein the laser light passes through the hole in the middle of the mirror.

* * * * *